US009686343B2

(12) United States Patent
Almeras et al.

(10) Patent No.: US 9,686,343 B2
(45) Date of Patent: Jun. 20, 2017

(54) METASEARCH REDIRECTION SYSTEM AND METHOD

(71) Applicant: Amadeus S.A.S., Sophia Antipolis (FR)

(72) Inventors: Arnaud Almeras, Roquefort les Pins (FR); Thomas Jaussoin, Mougins (FR)

(73) Assignee: AMADEUS S.A.S., Biot (FR)

( * ) Notice: Subject to any disclaimer, the term of this patent is extended or adjusted under 35 U.S.C. 154(b) by 294 days.

(21) Appl. No.: 14/144,979

(22) Filed: Dec. 31, 2013

(65) Prior Publication Data

US 2015/0188979 A1 Jul. 2, 2015

(51) Int. Cl.
G06F 15/16 (2006.01)
H04L 29/08 (2006.01)
G06F 17/30 (2006.01)

(52) U.S. Cl.
CPC ........ *H04L 67/02* (2013.01); *G06F 17/30864* (2013.01); *G06F 17/30887* (2013.01); *H04L 67/04* (2013.01); *H04L 67/10* (2013.01); *H04L 67/20* (2013.01); *H04L 67/2814* (2013.01); *H04L 67/2823* (2013.01)

(58) Field of Classification Search
USPC .......................... 709/202, 217, 218, 226, 245
See application file for complete search history.

(56) References Cited

U.S. PATENT DOCUMENTS

| 6,389,462 B1 | 5/2002 | Cohen et al. |
| 7,720,893 B2 | 5/2010 | Boudreau et al. |
| 8,375,127 B1 | 2/2013 | Lita |
| 2004/0087273 A1* | 5/2004 | Perttila .................. G01S 13/751 455/41.2 |
| 2006/0041843 A1* | 2/2006 | Billsus ............... G06Q 30/0633 715/714 |
| 2006/0218143 A1* | 9/2006 | Najork .............. G06F 17/30864 |
| 2008/0082687 A1* | 4/2008 | Cradick ............ G06F 17/30861 709/246 |
| 2010/0161642 A1* | 6/2010 | Chen ................. G06F 17/30864 707/759 |
| 2011/0107190 A1* | 5/2011 | Henderson, Jr. ........ G06F 11/10 714/798 |

FOREIGN PATENT DOCUMENTS

WO   0249278 A2   6/2002

OTHER PUBLICATIONS

International Search Report and Written Opinion of the International Searching Authority; International Application No. PCT/EP2014/077040; (Mar. 17, 2015).
European Patent Office, Search Report issued in Application No. 13199903.9 dated Jun. 5, 2014.

* cited by examiner

*Primary Examiner* — Liangche A Wang
(74) *Attorney, Agent, or Firm* — Thompson Hine LLP

(57) ABSTRACT

Methods, systems, and computer program products for redirecting a user from a metasearch website to a service provider website. A first uniform resource locator (URL) may be received from a client device at a redirection system. The first URL may have a first format including a plurality of fields containing information related to a product distributed at the website of the service provider. A second uniform resource locator (URL) may be generated from the fields of the first URL. The second URL may have a second format that is predetermined by the service provider. The client device may be provided access to the website of the service provider using the second URL.

20 Claims, 5 Drawing Sheets

METASEARCH REDIRECTION SYSTEM AND METHOD

BACKGROUND

The invention generally relates to computers and computer software, and in particular to methods, systems, and computer program products for redirecting a user from a metasearch website to a service provider website.

General-purpose search engines can be used by consumers to search for products and to purchase those products online. However, general-purpose search engines may lack efficiency to search for some domain-specific products, such as travel products. To fill this perceived gap, domain-specific search engines (e.g., metasearch engines or vertical search engines) have arisen to help the users purchase domain-specific products distributed by on-line service providers. Consumers can submit a query from a webpage at the metasearch website to specify the desired product (e.g., a flight or a hotel) and user criteria (e.g., number of passengers, departure time, arrival time). In response to the query, the metasearch engine searches in its product database and returns various product options to the consumer. The consumer may select one of the product options. The consumer's query is then redirected to the service provider distributing the product associated with the product option so that the consumer can obtain more information about the product and/or conduct a purchase transaction.

To redirect the consumer to the Internet domain of the service provider (e.g., an eCommerce platform of the service provider), the metasearch engine uses a complex generic uniform resource locator (URL), which includes information related to the metasearch and the consumer browsing history, and maps the generic URL to the destination URL for the service provider associated with the selected product. Each service provider may have multiple URLs that are assigned based on brand, geographical region, etc. In this instance, the multiple URLs are heterogeneous and may differ in format. Instead of being directed to the destination URL, the link may be broken and the query redirection may instead display an error message to the consumer. Such inconveniences may prove burdensome for the consumer and even lead the consumer to abandon the product purchasing process.

Further, metasearch engines must implement and maintain the different URLs and parameter mapping for each eCommerce platform providing product options in its product database. This requires a complex cooperation between service providers and metasearches to maintain up-to-date URLs for purchasing handoffs to the service provider.

As a result, significant dependencies and tight synchronization constraints currently exist between the connected metasearches and the service providers to ensure that the right URLs are finally used to redirect the consumers.

SUMMARY

Embodiments of the invention generally comprise methods, systems, and computer program products for redirecting a client device from a website of a metasearch engine to a website of a service provider. Consistent with embodiments of the invention, a first uniform resource locator (URL) is received from a client device at a redirection system. The first URL has a first format including a plurality of fields containing information related to a product distributed at the website of the service provider. A second uniform resource locator (URL) is generated from the fields of the first URL. The second URL has a second format that is predetermined by the service provider. The client device is provided access to the website of the service provider using the second URL.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
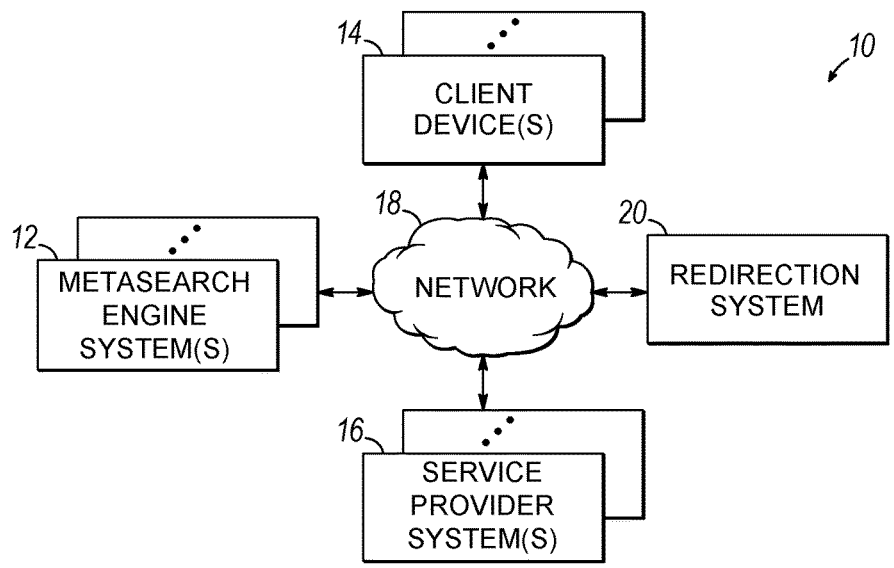
FIG. 1 is a diagrammatic view of an exemplary operating environment including a plurality of computer systems.

FIG. 1 provides a block diagram illustrating an operating environment 10 that includes one or more devices and/or systems consistent with embodiments of the invention. As shown in FIG. 1, the operating environment 10 includes one or more vertical search or metasearch engine systems 12 that may each be implemented as one or more servers. Each metasearch engine system 12 may be connected to a communication network 18, where the communication network 18 may comprise the Internet, a local area network (LAN), a wide area network (WAN), a cellular voice/data network, one or more high speed bus connections, and/or other such types of communication networks. Each metasearch engine system 12 may be dedicated to a specific service field (for example, the travel field). One or more client devices 14 may each be connected to the communication network 18, such that a user (e.g., a consumer) may initialize a travel planning and reservation session with one of the metasearch engine systems 12 to communicate a travel request and/or other such relevant data to the metasearch engine system 12. Each client device 14 may be a personal computing device, a tablet computer, a thin client terminal, a smartphone, and/or other such computing device. Each client device 14 may host web browsers and/or custom applications software (e.g., a client system) and may include a client user interface.

The operating environment 10 further includes one or more servers for one or more service provider systems 16 and a gateway engine or a gateway embodied by a redirection system 20 that is interposed between each metasearch engine system 12 and each service provider system 16. Each service provider system 16 and the redirection system 20 are connected to the communication network 18. Each service provider system 16 may host one or more websites and/or have a hosting service host one or more websites. Each service provider system 16 may be associated with a travel provider.

A user (i.e., a traveler) operating one of the client devices 14 may interface with the metasearch engine system 12 using the client device 14 in a travel planning and reservation session. The servers of the metasearch engine system 12 process the travel request received from the client device 14 according to a suitable communication protocol, such as the Hypertext Transfer Protocol (HTTP). The user may submit a travel request to the metasearch engine system 12 by entering information at the client device 14 through the website of the metasearch engine system 12. The information entered by the user may include location and timetable information for a trip. Information received from the user at the website is accumulated by the metasearch engine system 12 until the user triggers a search request for a product (e.g., by performing a submit action).

Each metasearch engine system 12 is configured to search for domain-specific information related to a given domain (for example, in the travel domain) in response to a user query from databases. Each metasearch engine system 12 may present information and product options to the user, and allow the user to purchase domain-specific products (for example, travel products such as flights or hotels) distributed by a plurality of service providers depending on the selection of the user. Each metasearch engine system 12 thus helps the user purchase a product that meets the user requirements, such as price, flight times, etc., for a product. If the metasearch engine system 12 finds a product as an option that matches the user query and the user selects the product, the metasearch engine system 12 redirects the user over the communication network 18 towards the Internet domain of the service provider system 16 distributing the found product, so that the user can complete a product purchase transaction.

Each service provider system 16 supplies products in the same field on its own e-commerce platform (service provider website). Responsive to a user query specified at the website of the metasearch engine system 12 for a product associated with a given service provider, the redirection system 20 is configured to dynamically redirect the user browser from the website of the metasearch engine system 12 to the website of the given service provider for purchasing the product by performing URL transformation.

An administrator of each service provider system 16 may access the redirection system 20 by entering the web address of the redirection system into a web browser which then accesses the address for the redirection system 20 and displays a homepage of an engine at the redirection system 20 that is dedicated to the service provider. The service provider administrator may register the service provider so that the service provider can be served by the redirection system 20. The service provider administrator may further load content specific to the service provider into the redirection system 20, including URL transformation rules, recommendation content, default page URL for redirection failure. Such service provider content will be used by the redirection system 20 in the process of redirecting users from the metasearch engine system 12 to the service provider system 16.

Each metasearch engine system 12 may be configured to connect with particular service providers in order to redirect consumers to those service providers.

Figure 2:
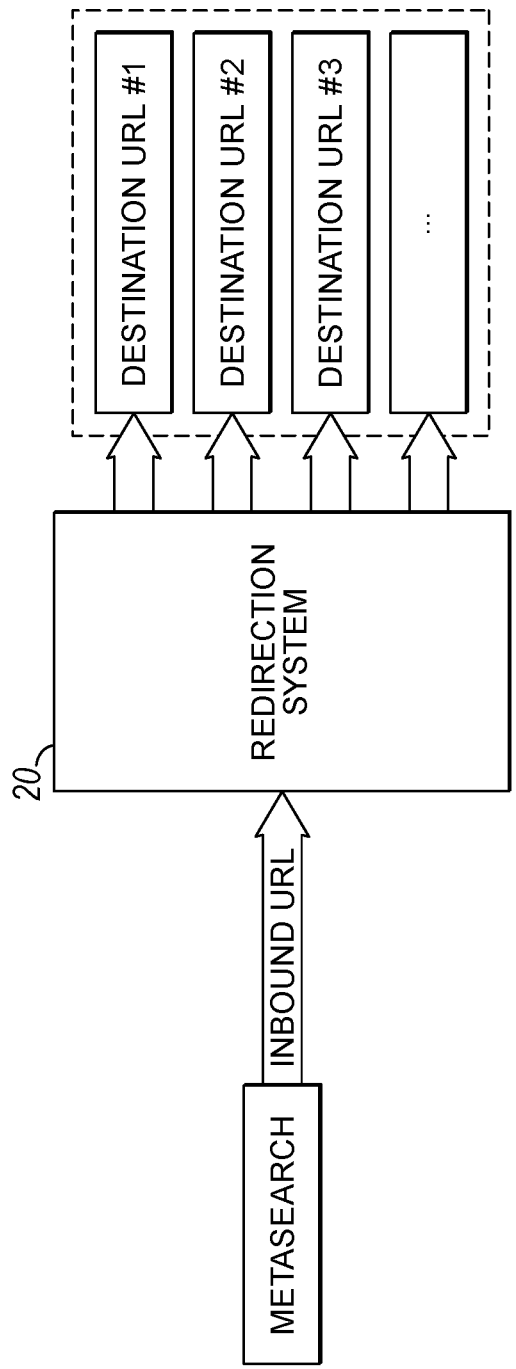
FIG. 2 is a block diagram of the redirection system illustrating the receipt of a URL from a metasearch engine at the redirection system and URLs that may be output by the redirection system.

FIG. 2 illustrates the operation of the redirection system 20 in accordance with certain embodiments of the invention. A user (e.g., a consumer) connected over the communication network 18 may access the products offered by the service provider system 16 through one of the metasearch engine systems 12 implemented by the service provider systems 16. Specifically, the user may specify an initial product query, select a product option in response to the presentation of a set of product options matching the initial user query, and submit a purchase query for the product (for example, a metasearch search in the form of a hotel booking query) using the website of one of the metasearch engine systems 12.

Responsive to the submission of the purchase query, the metasearch engine system 12 sends an inbound URL corresponding to the purchase query to the redirection system 20 so as to allow the consumer complete the product purchase. The inbound URL may or may not be visible to the user in the browser bar. If not visible, the user can access the inbound URL by viewing the source of the Metasearch webpage in case the metasearch engine system 12 precomputed the inbound URL.

The inbound URL has a format that is generic to all service providers. This format defines a set of fields, which may include a field related to the identity of the metasearch engine, fields including information related to the consumer purchase query, and a field related to the service provider (also referred to as a "destination service provider"), in a query string. As used herein, a field comprises a key (or name) and a value associated with the key. The key and value are separated by an equal sign, "=". For example, the key for the field "chain=NH" is "chain", and the value for the field "chain=NH" is "NH". The fields are concatenated with adjacent fields separated by an ampersand. More specifically, the set of URL fields may comprise general fields, such as a body, a service provider identifier field (e.g., a chain field), a metasearch engine identifier field (i.e., source field) identifying the metasearch engine system 12 that is the source of the metasearch, the language selected by the consumer (e.g., French or English); and/or fields of name/value pairs related to the consumer purchase query.

If the service provider is a travel provider offering travel products, the fields related to the consumer purchase query may include information such as, for example, a check-in date parameter, a check-out date parameter, a product identifier, and/or passenger information. The check-in date parameter may have the following syntax in a service provider URL: "cin", "checkindate", or "in" and may have various formats to specify the dates (for example for Aug. 23, 2014, the following formats may be used: 23082014, 08232014, 23AUG14). The "check-out date" parameter may have the following syntax in a service provider URL: "cout", "checkoutdate", or "out" and the "check-out date" parameter may also have various formats to specify the dates similar to those indicated above for the "check-in date" parameter. The product identifier may comprise a property code corresponding to the code of supplied product (e.g., a flight, a hotel, etc.). The passenger information may specified by the user in the query form (e.g., a number of adults). The inbound URL may include additional and/or different fields depending on the application.

The inbound URL, which is triggered by the submission of a purchase query by the consumer for a set of one or more products offered by the service provider "NH" from the website for a particular metasearch engine system (i.e., "ABC") as a source, may be for example: http://www.channelhubgateway.com/?chain=NH&propertyCode=NHNYC-123&checkin=12122014&checkout=14122014&source=ABC&lang=US&country=US&adults=2&children=2 This representative inbound URL corresponds to a query for a hotel booking for 2 adults and 2 children in the hotel NHNYC123 (defined by the property code field "PropertyCode") of hotel chain "NH" from Dec. 12, 2014 to Dec. 14, 2014.

The generic format of the inbound URL differs from the specific format of the URLs associated with the service providers. For example, the inbound URL includes information related to the metasearch source and related to the user query. The inbound URL has thus a standard format and follows metasearch rules for the service provider.

The redirection system 20 is configured to dynamically transform the inbound URL received in the generic format into a destination URL in a different, predetermined format that is specific to the destination service provider, based on the URL fields of the inbound URL (for example, service provider code, language, brand code, country, language, source, etc.). Each service provider system 16 may be associated with a plurality of destination URLs depending on the domain name system hierarchy (as examples, per brand or per geographical region). Each type of service provider URL may comprise a set of fields, each field comprising a key (or name) and a value associated with the name. The redirection system 20 is configured to transform the inbound URL into one of the applicable destination URLs of the service provider Internet domain.

The redirection system 20 thus presents a unique interface for multiple metasearch engine systems 12, regardless of the specificity of the destination URL and the parameters layout. The redirection system 20 may be implemented by an intermediary operator (for example, a Global Distribution System in the field of travel) to allow centralized management of the mapping between service provider URLs and metasearch URLs.

Further, the redirection system 20 may test the particular destination URL prior to redirecting the user. If the destination URL is not valid, the redirection system 20 may redirect the client device 14 of the consumer to a webpage for which the link is not broken. Otherwise, if the destination URL is valid, the client device 14 of the consumer is routed dynamically and transparently to the website at the service provider 16 by the redirection system 20.

Figure 3:
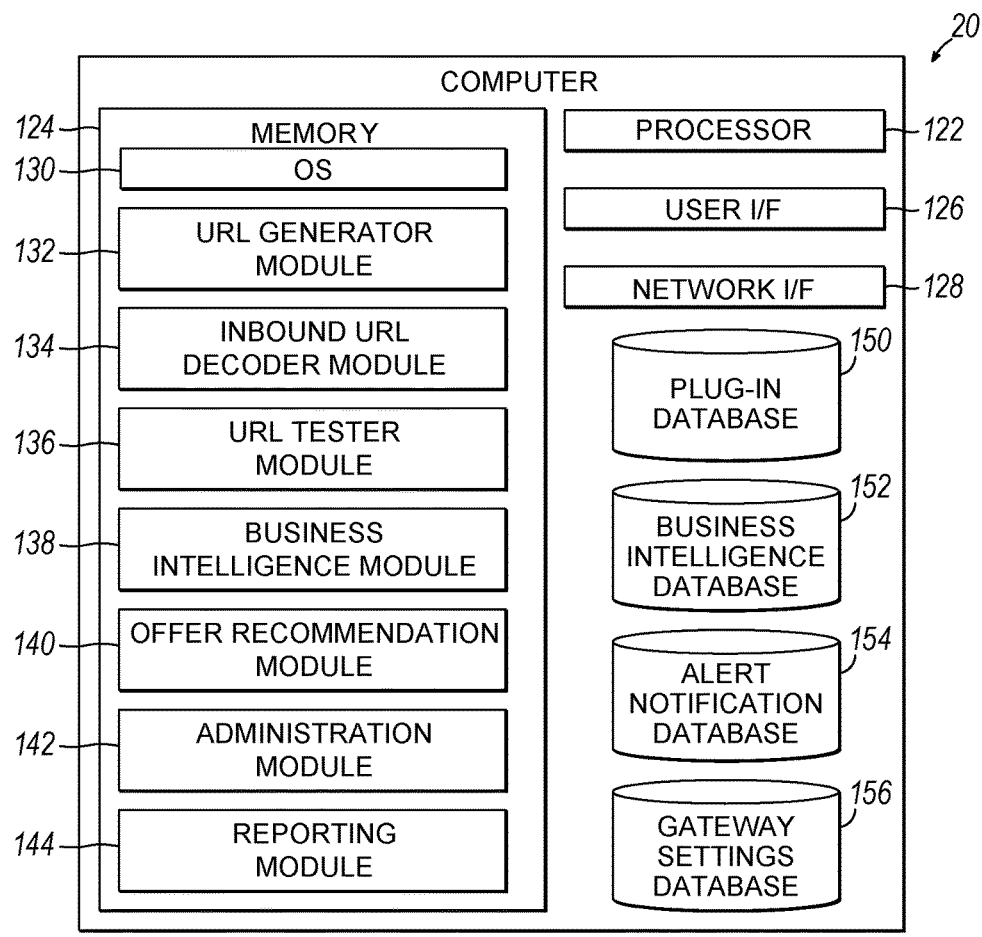
FIG. 3 is a diagrammatic view of an exemplary computer system of FIG. 1.

FIG. 3 provides a block diagram that illustrates the components of the one or more servers of the redirection system 20. The redirection system 20 includes at least one processor 122 including at least one hardware-based microprocessor and a memory 124 coupled to the at least one processor 122. The memory 124 may represent the random access memory (RAM) devices comprising the main storage of the redirection system 20, as well as any supplemental levels of memory, e.g., cache memories, non-volatile or backup memories (e.g., programmable or flash memories), read-only memories, etc. In addition, memory 124 may be considered to include memory storage physically located elsewhere in the travel and redirection system 20, e.g., any cache memory in a microprocessor, as well as any storage capacity used as a virtual memory, e.g., as stored on a mass storage device or on another computer coupled to the redirection system 20.

For interface with a user or operator, the redirection system 20 may include a user interface 126 incorporating one or more user input/output devices, e.g., a keyboard, a pointing device, a display, a printer, etc. Otherwise, data may be communicated to and from another computer or terminal (e.g., the client device 14, the service provider system 16, etc.) over a network interface 128 coupled to the communication network 18. The redirection system 20 also may be in communication with one or more mass storage devices, which may be, for example, internal hard disk storage devices, external hard disk storage devices, external databases, storage area network devices, etc.

The redirection system 20 typically operates under the control of an operating system 130 and executes or otherwise relies upon various computer software applications, components, programs, objects, modules, engines, data structures, etc., including for example, a URL generator module 132, an inbound URL decoder module 134, a URL tester module 136, a business intelligence module 138, an offer recommendation module 140, an administration module 142, and/or a reporting module 144. In general, the redirection system 20 may be configured to interface with one or more service providers (e.g., service provider systems 16) and one or more users (e.g., client devices 14) in association with booking and reserving travel inventory items for travel services based on received data.

The memory 124 of the redirection system 20 may generally store one or more databases including, for example, a transformation rules or plug-in database 150, a business intelligence database 152, an alert notification database 154, and a gateway settings database 156. The databases 150-156 may comprise data and supporting data structures that store and organize the data. In particular, the databases 150-156 may be arranged with any database organization and/or structure including, but not limited to, a relational database, a hierarchical database, a network database, and/or combinations thereof. A database management system in the form of a computer software application executing as instructions on the processing unit of the redirection system 20 may be used to access the information or data stored in records of the databases 150-156 in response to receipt of an inbound URL, where the determination of a destination URL may be dynamically performed by the operating system 130, other applications, and/or one or more of modules and/or engines 132-138.

Moreover, various applications, components, programs, objects, modules, engines etc. may also execute on one or more processors in another computer coupled to the redirection system 20 via the communication network 18, e.g., in a distributed or client-server computing environment, whereby the processing required to implement the functions of a computer program may be allocated to multiple computers over a network. For example, some of the functionality described herein as being incorporated into the redirection system 20 and/or modules of the redirection system 20 may be implemented in one or more servers. Consistent with embodiments of the invention, the modules and/or engines 132-144 and/or other such modules, applications, and/or engines may be executing on one or more servers of the redirection system 20, and the modules and/or engines 132-144 may cause the processor 122 of the redirection system 20 to perform operations consistent with embodiments of the invention.

The plug-in database 150 may be configured to store sets of URL transformation plug-ins or rules associated with respective service provider systems 16. A new plug-in defining a set of URL transformation rules may be added for a service provider in the plug-in database 150, when a new website from the service provider system 16 is to be accessed by one or more of the metasearch engine systems 12. A service provider plug-in may be added to the plug-in database 150 by a service provider administrator having specific access rights to manage the redirection system settings via an administration module 142 providing a dedicated Graphical User Interface (GUI) to service providers.

Each service provider plug-in defines URL transformation rules that may be applied to transform the generic URL format of the metasearch (inbound URL in the first format) to the destination URL (also referred to as "outbound URL") that is specific to the service provider system 16 of the service provider. Each transformation rules defines a transformation pattern for transforming the inbound URL into an outbound URL. The transformation rules may comprise field transformation rules configured to transform each field in the inbound URL into a destination field in the destination URL, format conversion rules for converting the inbound URL format into the outbound URL format, parsing rules for parsing the inbound URL, and/or merging rules for merging fields of the inbound URL. Each transformation plug-in associated with a respective service provider may be a source file defining a set of transformation rules between an inbound URL and a destination URL, and particularly a Xquery plug-in (for example, in the form of a XQuery script) which may comprise regular expressions. These plug-ins may be stored in the system once they are added by an administrator of the service provider using the administration module 142.

The mapping between each service provider identifier (in the inbound URL format) and the associated plug-in that is to be used may be also stored in the plug-in database 150, for example in the form of XQueries stored as a Binary Large Object in a file system (filesystem). For a given inbound URL triggered by a user purchasing query from a metasearch website for purchasing products offered by a given service provider system 16, the redirection system 20 may thus retrieve the suitable service provider plug-in from the plug-in database 150 using such mapping.

The inbound URL decoder module 134 of the redirection system 20 may be configured to decode each inbound URL as well as the different parameters comprised in the inbound URL, the inbound URL being previously received by the redirection system 20 in response to a purchase query submitted from the metasearch engine website for certain products of a given service provider. The inbound URL decoder module 134 may receive gateway settings from the gateway setting database 156.

The URL generator module 132 of the redirection system 20 may be configured to generate the destination URL from the decoded inbound URL. To generate the destination URL, the URL generator module 132 is arranged to retrieve the plug-in(s) associated with the identified service provider system 16 from the plug-in database 150, and generate the destination URL from the transformation rules defined by the retrieved plug-ins. The URL generator module 132 may also receive gateway settings from the gateway setting database 156.

In travel field example, the following URL can be determined by the metasearch engine system 12 as the inbound URL received from the metagateway ABC for the purchase of products from the service provider NH: http://www.gateway.com/?chain=NH&propertyCode=HYNY-C12&checkin=12122014&checkout=14122014&source=ABC&lang=US&country=US&adults=2&children=2

The URL transformation rules associated with NH service provider may include, for example, the following rules:

a. If the inbound URL comprises the field "&country=US", transforming the inbound URL into the following "destination" URL by applying the parameter mapping of the plug-in for service provider ABC: http://NH.com/?pCode=HYNYC12&cin=12122014&cout=14122014&src=ABC&lg=USA&adult=2&child=2&token=META b. If the inbound URL comprises "&country=FR", transforming the inbound URL into the following "destination" URL by applying a different parameter mapping of the plug-in for service provider ABC: http://NH.eu/?property=HYNYC12&in=12DEC14&out=14DEC14&src=ABC&adult=2&child=2.

According to another aspect of the invention, the URL tester module 136 of the redirection system 20 may be configured to test the destination URL and detect URL errors such as HTTP errors. If errors are detected, a redirection function may be used to redirect the client device 14 of the consumer to a default webpage predefined by the service provider. For example, if a broken URL (e.g., a "404 Not Found" standard response code when communicating via HTTP) is detected by the URL tester module 136, the redirection function may redirect the user to the service provider homepage.

In addition, the URL tester module 136 may raise alerts if errors are detected. Alerts may be raised by posting alert notifications in the alert notification database 154. The redirection system 20 may be configured to alert a service provider administrator of errors through a service provider administration module 142 based on the notifications maintained in the alert notification database 154. The service provider administrator may acknowledge error notifications.

Alternatively, the redirection system 20 may be configured to generate an email notification to the service provider administrator each time a broken link is detected by the URL tester module 136.

In addition, prior to redirecting the user to the service provider web site, if a recommendation option has been set up in that way for the chosen service provider, the redirection system 20 may insert an intermediary page to display content recommendation, such as an advertisement, an upsell offer, or a cross-sell offer. The user can select the link associated with the content recommendation or deny it. If the content recommendation is refused by the user (the recommendation link is not selected), the user may be redirected to the Internet domain of the service provider. Otherwise, the user will be redirected to the page associated with the recommendation link for more information on the recommended product or to purchase the recommendation product. The offer recommendation module 140 of the redirection system 20 may be configured to dynamically generate content recommendation to the users at the client devices 16 through a dedicated recommendation GUI. The recommendation content may depend on the destination service provider (i.e., the service provider providing the products requested through the inbound URL) and may vary depending on user or product information. The recommendation content associated with each service provider may be stored in the redirection system.

The generation of the recommendation content may be based on predefined rules (also referred to thereinafter as "recommendation criteria") related to information extracted from the parameters of the destination URL (for example, destination, dates, number of passengers parameters), and/or to information collected from web forms filled and submitted by the consumer during the redirection process, and/or to the consumer profile. The offer recommendation module 140 may use the rules previously defined by the service provider to identify the recommendation content that is to be displayed to the user. The recommendation content may be initially added to the redirection system 20 by each new service provider when the website of the service provider system 16 is to be accessed by metasearch engine systems 12. The recommendation content as well as the recommendation criteria may be initially added by an administrator of the service provider having suitable access rights through the dedicated GUI of the administration module 142. Different types of recommendation content can be displayed in an intermediary page to the user interface depending on predefined business rules, such as the following recommendation content related to the travel field. If the redirection system 20 detects that the consumer is a business traveler, then a frequent traveler program can be displayed with a "sign-up" button, and/or special travel offers can be displayed with a promotion code (e.g., free internet for hotels or airlines). If the redirection system 20 detects that the consumer is a leisure traveler, that his or her age is below 50 year old, that he is only travelling with his or her spouse, and that the selected dates correspond to the Summer period, then a recommendation offer inserted by the service provider could be a romantic package including a "caleche" tour of the city.

The redirection system 20 may thus be used to dynamically generate other purchasing opportunities to the consumer while ensuring that such recommendations are adapted to the user. The redirection system 20 may capture the user information transiting through its channel, either transparently or on demand to generate customized recommendations and to accumulate consumer information.

More generally, the information related to the traffic passing through the redirection system 20 may be collected by the business intelligence module 138 (also referred to as an information collecting module). In particular, the business intelligence module 138 may be configured to collect information about consumers according to predefined criteria. Such information may be used to generate customized recommendations or alternatively to compute metrics related to the consumers' behaviour. The collected information may be stored in the business intelligence database 152. The business intelligence module 138 may be provided with an XML feeder to collect information in the form of XML files.

In certain embodiments of the invention, the redirection system 20 may feed the business intelligence module 138 with information related to purchasing traffic (for example booking traffic). In a travel application of the invention, the data stored in the business intelligence module 138 may for example comprise, for each booking query passing through the redirection system 20, the booking date and time information (including leadtime and length of stay for hotel booking), the consumer country, the language selected by the consumer for the booking, the identity of the travel provider; and information about the booked product (hotel property, flight, rental . . . ). Additional information may be gathered from web-forms submitted to the consumers and stored by the business intelligence module 138 in the business intelligence database 152. Specifically, a webform may be presented by the redirection system 20 to each consumer to collect user information such as, for example, for a travel booking application of the invention through a recommendation offer page, segment information (e.g. leisure/business), user points of interest, user age, and information about other travelers. The webform may be presented to the user in an intermediary webpage after computation of the destination URL and redirection to the service provider ecommerce platform.

The information collected through the redirection system 20 may be passed to the service provider to adapt the product or service offered to the consumer profile (business or leisure, family or not, points of interests) or may be used by the recommendation engine to generate customized recommendation content to the user, either in an intermediary webpage before reaching the destination URL or directly in the service provider eCommerce platform accessed through the destination URL.

The information collected by the business intelligence module 138 further allows capturing the consumers' behavior per Metasearch at a unique point (the redirection system 20). Such collected information may be used to compute different metrics such as a conversion rate between the number of redirections achieved by each metasearch towards a given service provider and the actual product purchases made in the website of the service provider as a result of such redirections. The business intelligence module 138 may maintain, for each service provider, a counter per metasearch engine from collected information in which each counter is associated with a given metasearch engine and represents a number of inbound URLs redirected by the metasearch engine to the service provider. These metrics may be used by the service provider to obtain accurate information about the effective contribution of each metasearch engine with respect to the products and services sold by each service provider.

The reporting module 144 of the redirection system 20 may be configured to generate reports on the consumers to the service provider systems 16 and/or on the metasearch conversion rates. The reports may be displayed to the service providers through a reporting GUI. The notification reports may be generated and supplied to the service provider at a predefined frequency or in response to a service provider query.

The recommendation module 140, the administration module 142 and the reporting module 144 may be part of a content management system provided in a webserver that may optionally constitute part of the redirection system 20. The content management system may be used to supply gateway settings to the gateway setting database 156.

Figure 4:
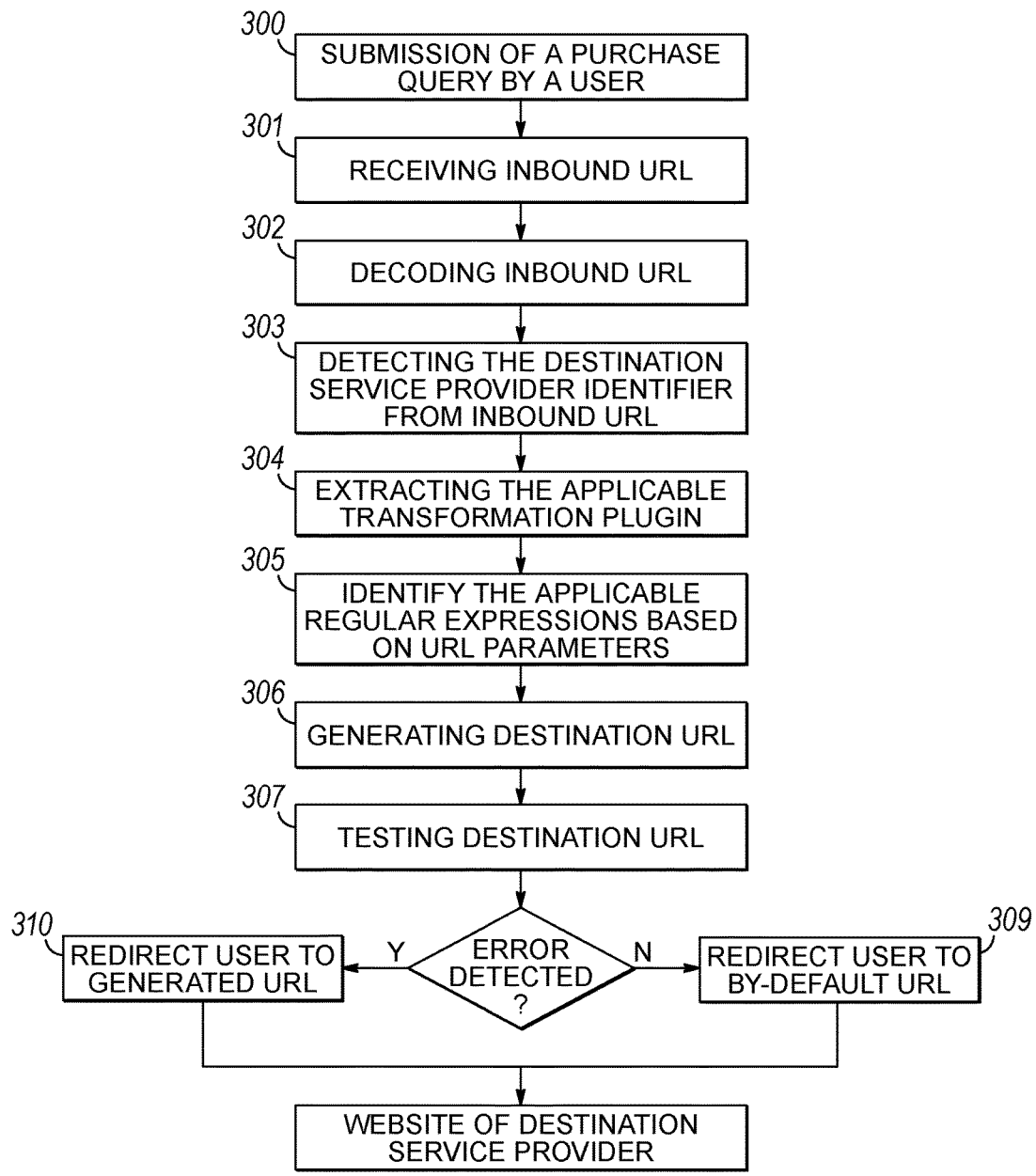
FIG. 4 is a flowchart of a redirection method in accordance with an embodiment of the invention.
Figure 5:
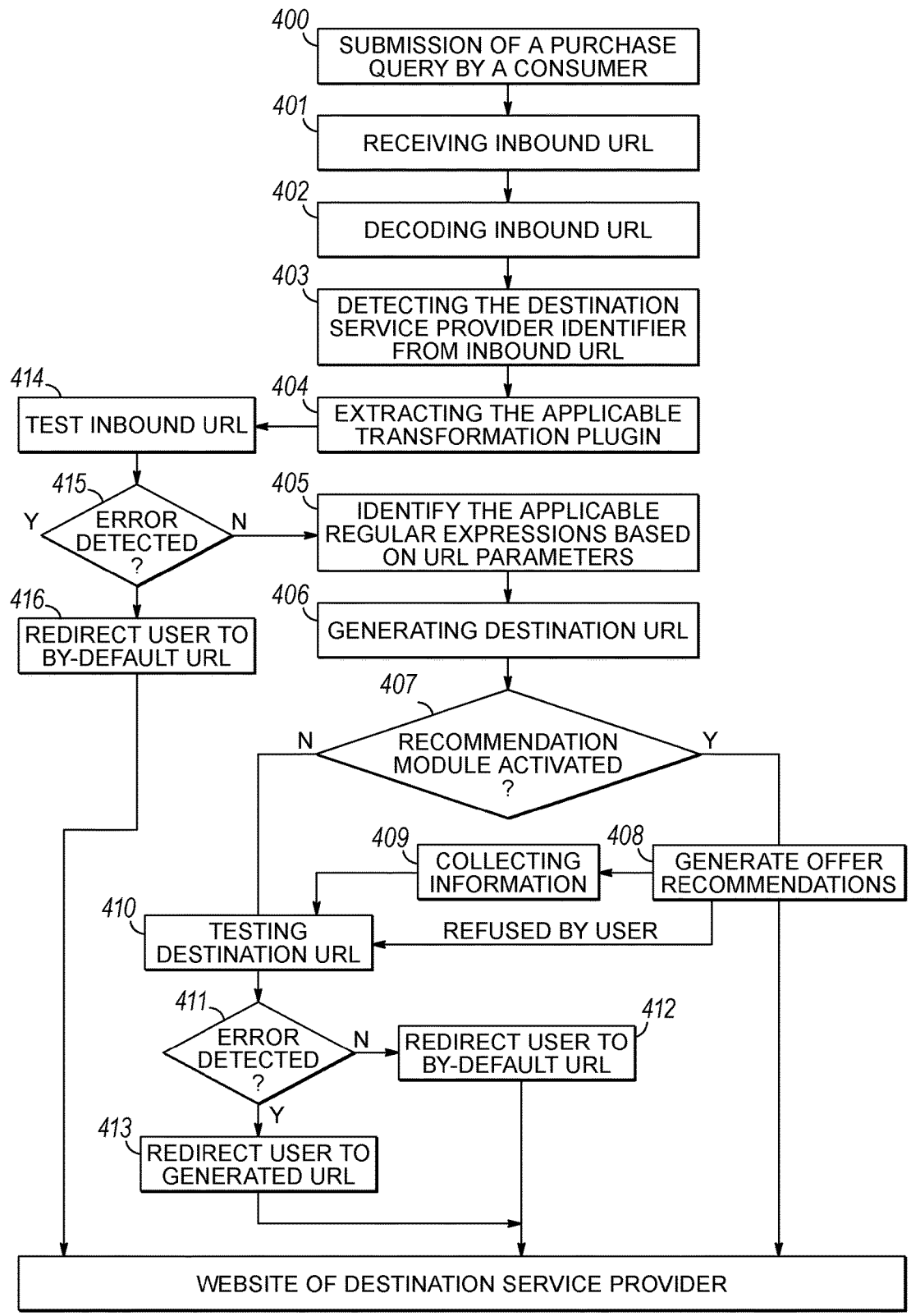
FIG. 5 is a flowchart of a redirection method in accordance with an embodiment of the invention.

FIG. 4 is a flowchart illustrating a redirection method in accordance with an embodiment of the invention.

In block 300, a consumer connected to a given metasearch website inputs information at the client device 16 for purchasing a given product. For example, the metasearch engine can be dedicated to travel offers for a given mode of transport or for several modes of transport. The metasearch engine system 12 can be coupled to a set of service provider systems 16 if the service providers implement the metasearch. Conversely, a given service provider system 16 can implement several metasearch engine providers.

The consumer may then submit a purchasing query for the specified product, for example by clicking on a "Book" activation button on the user interface to book a travel for which timetable information, origin location, destination location and number of passenger which have been specified.

In response to the submission of the consumer product query to the metasearch engine system 12, in block 301, the redirection system 20 receives a generic inbound URL having a generic format (i.e., the format is independent from the destination service provider), such as for example: http://www.gateway.com/?chain=HY&propertyCode=HYNYC12&checkin=12122014&checkout=14122014&source=ABC.

In block 302, the redirection system 20 decodes the inbound URL to extract the different fields (i.e., a key and a value for each field). In a preferred embodiment of the invention, the inbound URL may be previously converted into in a markup language such as XML (eXtensible Markup Language), which provides for the above exemplary inbound URL:

```
<inboundURL>
    <chain>HY</chain>
    <propertyCode>HYNYC12</propertyCode>
    <checkin>12122014</checkin>
    <checkout>14122012</checkout>
```

-continued

```
    <source>ABC</source>
</inboundURL>.
```

In block 303, the redirection system 20 detects the destination service provider based upon the service provider identifier comprised in the inbound URL. When a previous transformation into a markup language is used, the destination service provider may be directly determined from the converted inbound URL. In the above example, where the inbound URL is converted into XML, the destination service provider "HY" may for instance be detected from the corresponding XML tag "<chain>" and the related expression "<chain>HY</chain>".

In block 304, the transformation plug-in associated with the detected destination service provider is retrieved from the plug-in database 150 using the mapping information between service providers and transformation plug-ins.

The transformation plug-in for the destination service provider "HY" may be for instance a XQuery "HY_Transform" script, such as:

```
    let $doc :=
for $v in $doc//inboundURL
    $a in $doc//propertyCode
    $b in $doc//checkin
    $c in $doc//checkout
    $d in $doc//source
return "http://www.HY.com/?HotelCode="+$a+"&CIDate="+$b+"&NBNights="+
($c−$b)+"&Channel="$d"
```

In block 305, the regular expressions of the transformation plug-in that are to be applied are identified based on the inbound URL parameters, such as "$c-$b" in the above example. The destination URL (also referred to as outbound URL) is then generated in block 306. This includes converting each field of the inbound URL into a destination field and constructing the destination URL from the different destination fields by applying the transformation rules defined by the transformation plug-in identified in block 304. In the considered example, the following destination URL may for instance be generated: http://www.HY.com/?HotelCode=HYNC12&CIDate="12122014"&NBNights=2&Channel=ABC In block 307, the destination URL is tested. If errors are detected in the destination URL, the consumer may be redirected to a default page (block 309). Otherwise, the consumer is directed to the requested webpage of the destination service provider in order to complete the product purchase (block 310).

FIG. 4 is a flowchart of the redirection method in accordance with another embodiment of the invention. Blocks 400 to 404 are similar to blocks 300 to 304, respectively. In block 400, the consumer submits a purchasing query for a specified product similarly to block 300. The redirection system 20 then receives the inbound URL generated by the metasearch engine system 12, in block 401. In block 402 to 404, the redirection system 20 decodes the inbound URL to extract the different fields (key and value for each field), and then extracts the suitable plug-in(s) for the destination service provider system 16 from the plug-in database 150 which provide the URL transformation rules per service provider.

In block 414, the inbound URL may be tested by trying the URL and catching the error before it is displayed to the end user. If such an error is detected in block 415, such as for example a broken link, the consumer may be redirected in block 416 to a default page predefined by the service provider (for example, the service provider homepage). The plug-in extracted in block 404 may be used to determine the default page in certain embodiments of the invention, if the service provider plug-ins comprise consumer redirection rules. Alternatively, the redirection system 20 may use separate consumer redirection rules associated with the service provider and stored in a different database from the plug-in database 150. The consumer redirection rules may be loaded initially by an administrator of the service provider when the service provider is coupled to metasearches. It should be noted that block 414-416 may be performed alternatively before block 403, if the consumer redirection rules are not extracted from the plug-in database 150.

If no error is detected in the inbound URL, in block 405, the redirection system 20 identifies the regular expressions among the extracted transformation rules that are to be applied to the inbound URL, based on the fields of the inbound URL. In block 406, the redirection system 20 converts each field of the inbound URL into a destination fields and construct the destination URL from the different destination fields by applying the rules defined by the regular expressions identified in block 305.

In block 407, if the content recommendation service is activated by the destination service provider system 16, the redirection system 20 may generate an intermediary page with offer recommendations proposed by the service provider and/or with webforms to collect information from the consumer (block 408). If the consumer accepts the recommendations for other content distributed by the service provider (for example, by clicking on a link on the intermediary page), the consumer is directed to the recommended content associated with the selected link in service provider web site or the website of a partner of the service provider. If webforms are displayed in the intermediary webpage, and if the consumer fills in the webform and submit it, the information may be collected in the business intelligence database 152 (block 409). If no webform is displayed or if the consumer ignores or refuses to fill in the webform, the destination URL is tested in block 410. If errors are detected in the destination URL (block 411), the consumer is redirected to a default page in a manner similar to block 412. Otherwise, the consumer is directed to the requested webpage of the service provider to complete the product purchase in block 413.

Figure 6:
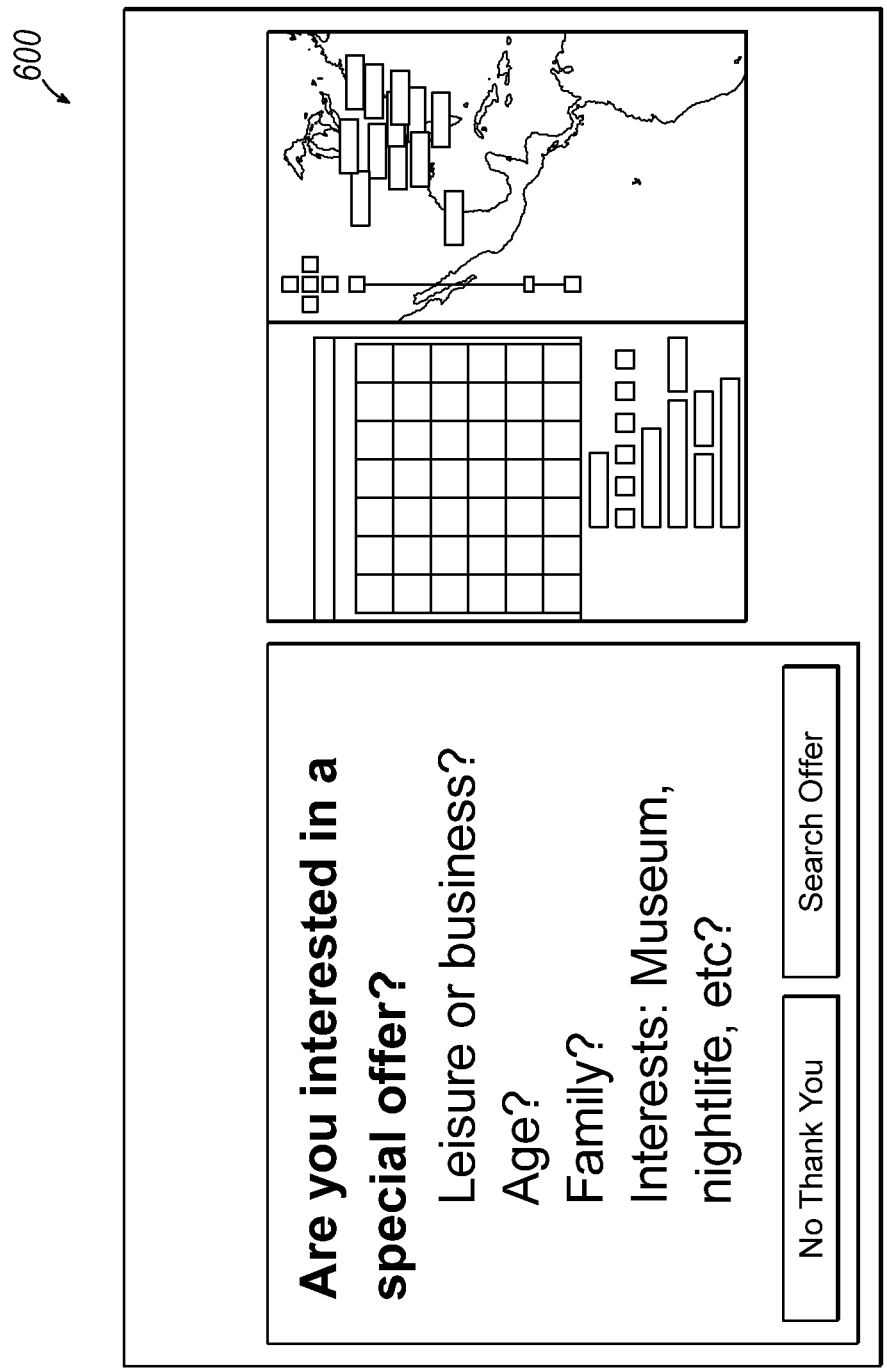
FIG. 6 is an exemplary intermediary webpage to which a client device may be redirected by the redirection system.

FIG. 6 shows an exemplary intermediary webpage 600 to which the client device 14 of the consumer may be redirected by the redirection system 20 if an error is detected in the destination URL (block 311). The intermediary webpage 600 displays offer recommendations. In the example of FIG. 6, the service provider may be a hotel provider (e.g., NH hotel). The intermediary webpage 600 may be displayed on a GUI at the client device 14. The consumer may decide to ignore the offer recommendation by selecting "NO THANK YOU" or accept the recommendation by selecting "SEARCH OFFER". The webpage 600 also includes a form with some questions that can be answered by the consumer if he or she is interested in special offers (leisure or business trip, traveler age, desired activities, etc.). This allows the redirection system 20 to collect additional user information. Also, the intermediary webpage 600 can comprise a sign-up option if the user wishes to sign-up in the service provider website.

The redirection system 20 thus allows for a dynamic and centralized conversion of an inbound URL, which is transmitted from a metasearch engine in response to the submission of a service provider product query, into a destination URL having a format specific to the destination service provider and different from the format of the inbound URL. The redirection system thus obviates the need for the metasearch engine to maintain a mapping with the service provider's URL and integrate every mapping change. Accordingly, upgrade and/or migration of service provider websites can be transparent to the metasearch engine systems 12.

The redirection system 20 can further form a unique channel where all consumers can go through before being redirected to the destination service provider website. The redirection system 20 defines a unique gateway and utilizes a common set of parameters for the booking handoff to the service provider system 14. The redirection system 20 may allow accumulation of exhaustive information about consumer behavior, and providing such information or metrics derived from such information to the service providers. As a result, the service providers can better adapt their offers to the consumers and/or understand the contribution of each metasearch engine on sold products.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the present invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. For example, the embodiments of the invention are not limited to the type of inbound URL fields or type of URL transformation rules used in the described embodiments of the invention. As another example, the information collected by the business intelligence module 138 may be applied to compute different types of metrics, whether directly by the redirection system 20 or by an external entity such as the service providers. Accordingly, departures may be made from such details without departing from the spirit or scope of the Applicant's general inventive concept.

What is claimed is:

1. A method for redirecting a client device from a website of a metasearch engine to a website of a service provider, the method comprising:
   receiving, at a processor of a redirection system from the client device via the website of the metasearch engine, a first uniform resource locator (URL) in a first format including a plurality of fields containing name and value pairs related to a product distributed at the website of the service provider and a name and value pair including an identifier for the service provider;
   generating, with the processor of the redirection system, a second uniform resource locator (URL) from the fields of the first URL, the second URL having a second format that is predetermined by the service provider and including a domain generated based on the identifier for the service provider from the name and value pair of the first URL; and
   providing, with the processor of the redirection system, access for redirecting the client device to the website of the service provider using the second URL.

2. The method of claim 1 wherein generating the second URL from the fields of the first URL comprises:
   applying a plurality of transformation rules associated with the service provider to transform the fields of the first URL to a plurality of fields of the second URL, each transformation rule defining a transformation pattern between the fields of the first URL and the fields of the second URL.

3. The method of claim 2 wherein the transformation rules include format conversion rules, URL parsing rules, or merging rules.

4. The method of claim 2 wherein applying the transformation rules associated with the service provider to transform the fields of the first URL to the fields of the second URL comprises:
   decoding the first URL;
   extracting the fields of the first URL; and
   retrieving the transformation rules associated with the service provider using an identifier of the service provider extracted from one of the fields of the first URL.

5. The method of claim 1 further comprising:
   testing the second URL; and
   if an error is detected, generating a default webpage predefined by the service provider, generating an error notification, or a combination thereof.

6. The method of claim 5 further comprising:
   adding the error notification to an alert notification database; and
   generating a notification report to the service provider at a predefined frequency or in response to a service provider query.

7. The method of claim 1 further comprising:
   collecting information related to the first URL.

8. The method of claim 7 wherein the collected information is derived from the fields of the first URL.

9. The method of claim 7 wherein the collected information includes data related to a user of the client device, data related to the product, data related to the metasearch engine, or a combination thereof.

10. The method of claim 7 further comprising:
    selecting recommendation content for additional products based on the collected information; and
    causing an intermediary webpage including the recommendation content to be displayed at the client device.

11. The method of claim 1 wherein the first format of the first URL is determined by the metasearch engine, the first URL includes an identifier of the metasearch engine, and the first URL is received in response to a query submitted at the website of the metasearch engine using the client device.

12. A system for redirecting a client device from a website of a metasearch engine to a website of a service provider, the system comprising:
    at least one processor; and
    program code configured to be executed by the at least one processor to cause the at least one processor to:
    receive, from the website of the metasearch engine, a first uniform resource locator (URL) in a first format including a plurality of fields containing name and value pairs related to a product distributed at the website of the service provider and a name and value pair including an identifier for the service provider from the name and value pair of the first URL;
    generate a second uniform resource locator (URL) from the fields of the first URL, the second URL having a second format that is predetermined by the service provider and including a domain generated based on the identifier for the service provider; and
    provide access for redirecting the client device to the website of the service provider using the second URL.

13. The system of claim 12 wherein the program code configured upon execution to cause the processor to generate the second URL from the fields of the first URL comprises:
    the program code being configured upon execution to cause the processor to apply a plurality of transformation rules associated with the service provider to transform the fields of the first URL to a plurality of fields of the second URL, each transformation rule defining a transformation pattern between the fields of the first URL and the fields of the second URL.

14. The system of claim 13 wherein the program code configured upon execution to cause the processor to apply a plurality of transformation rules associated with the service provider to transform the fields of the first URL to the fields of the second URL comprises:
    decoding the first URL;
    extracting the fields of the first URL; and
    retrieving the transformation rules associated with the service provider using an identifier of the service provider extracted from one of the fields of the first URL.

15. The system of claim 12 wherein the program code is configured to be executed by the at least one processor to cause the at least one processor to:
    test the second URL; and
    if an error is detected, generate a default webpage predefined by the service provider, generating an error notification, or a combination thereof.

16. The system of claim 15 wherein the program code is configured to be executed by the at least one processor to cause the at least one processor to:
    add the error notification to an alert notification database; and
    generate a notification report to the service provider at a predefined frequency or in response to a service provider query.

17. The system of claim 12 wherein the program code is configured to be executed by the at least one processor to cause the at least one processor to:
    collect information related to the first URL.

18. The system of claim 17 wherein the collected information is derived from the fields of the first URL.

19. The system of claim 12 wherein the program code is configured to be executed by the at least one processor to cause the at least one processor to:
  select recommendation content for additional products based on the collected information; and
  cause an intermediary webpage including the recommendation content to be displayed at the client device.

20. A program product comprising:
  a non-transitory computer readable storage medium; and
  program code stored on the computer readable storage medium and configured, upon execution, to cause at least one processor of a redirection system to:
  receive, from a website of a metasearch engine, a first uniform resource locator (URL) in a first format including a plurality of fields containing name and value pairs related to a product distributed at the website of the service provider and a name and value pair including an identifier for the service provider;
  generate a second uniform resource locator (URL) from the fields of the first URL, the second URL having a second format that is predetermined by the service provider and including a domain generated based on the identifier for the service provider from the name and value pair of the first URL; and
  provide access for redirecting the client device to the website of the service provider using the second URL.

* * * * *